(12) United States Patent
Jones et al.

(10) Patent No.: US 9,916,047 B2
(45) Date of Patent: Mar. 13, 2018

(54) PATTERN OF ELECTRODES FOR A TOUCH SENSOR

(75) Inventors: Gareth Jones, Ringwood (GB); Matthew Trend, Fareham (GB)

(73) Assignee: Atmel Corporation, San Jose, CA (US)

( * ) Notice: Subject to any disclaimer, the term of this patent is extended or adjusted under 35 U.S.C. 154(b) by 749 days.

(21) Appl. No.: 13/618,068

(22) Filed: Sep. 14, 2012

(65) Prior Publication Data

US 2014/0078068 A1    Mar. 20, 2014

(51) Int. Cl.
*G06F 3/044* (2006.01)

(52) U.S. Cl.
CPC .................. *G06F 3/044* (2013.01)

(58) Field of Classification Search
CPC .. G06F 2203/04111; G06F 2203/04112; G06F 2203/04113; G06F 3/041; G06F 3/044; G06F 2203/0339
See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2009/0002337 | A1* | 1/2009 | Chang ............... G06F 3/044 345/174 |
| 2009/0315854 | A1 | 12/2009 | Matsuo |
| 2010/0045614 | A1* | 2/2010 | Gray et al. ............... 345/173 |
| 2010/0045615 | A1* | 2/2010 | Gray ................ G06F 3/044 345/173 |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2013/0278513 | A1* | 10/2013 | Jang ................ G06F 3/044 345/173 |

FOREIGN PATENT DOCUMENTS

WO   WO 2012/129247     9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Richard Hong
(74) *Attorney, Agent, or Firm* — Baker Botts L.L.P.

(57) ABSTRACT

In certain embodiments, a touch sensor comprises a substrate and a plurality of electrodes disposed on the substrate. The plurality of electrodes comprise a drive line having a plurality of drive electrodes and a sense line having a plurality of sense electrodes. At least one of the drive line and sense line has at least three rows of electrodes.

11 Claims, 7 Drawing Sheets

PATTERN OF ELECTRODES FOR A TOUCH SENSOR

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine the position of the change in capacitance on the touch screen.

DESCRIPTION OF EXAMPLE EMBODIMENTS

Figure 1:
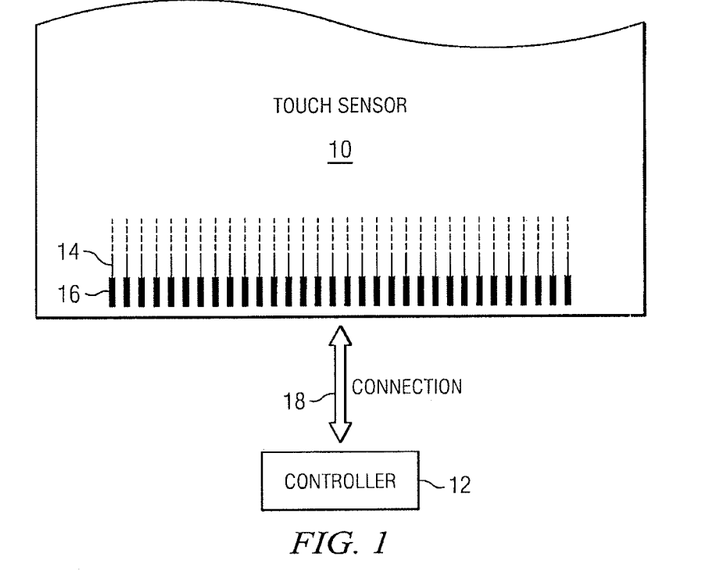
FIG. 1 illustrates an example touch sensor with an example touch-sensor controller, according to certain embodiments of the present disclosure.

FIG. 1 illustrates an example touch sensor 10 with an example touch-sensor controller 12, according to certain embodiments of the present disclosure. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2A:
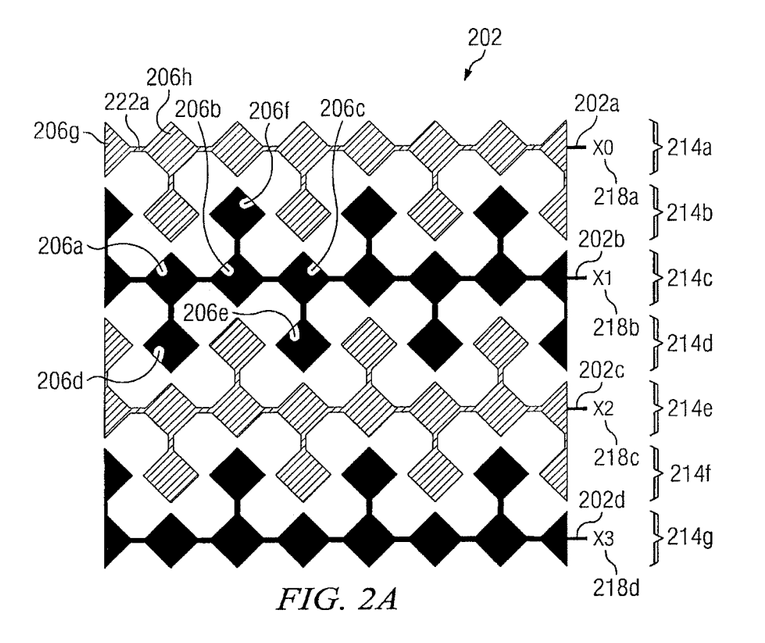
FIGS. 2A, 2B, and 2C illustrate separate and combined electrodes of a touch sensor, according to certain embodiments of the present disclosure.
Figure 2B:
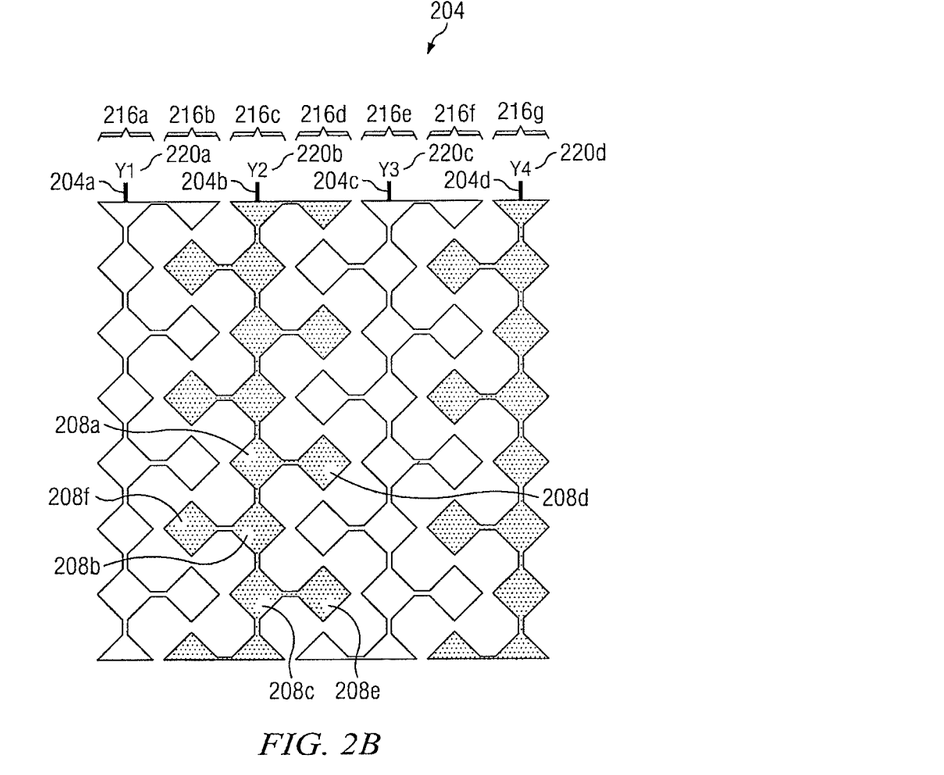
Figure 2C:
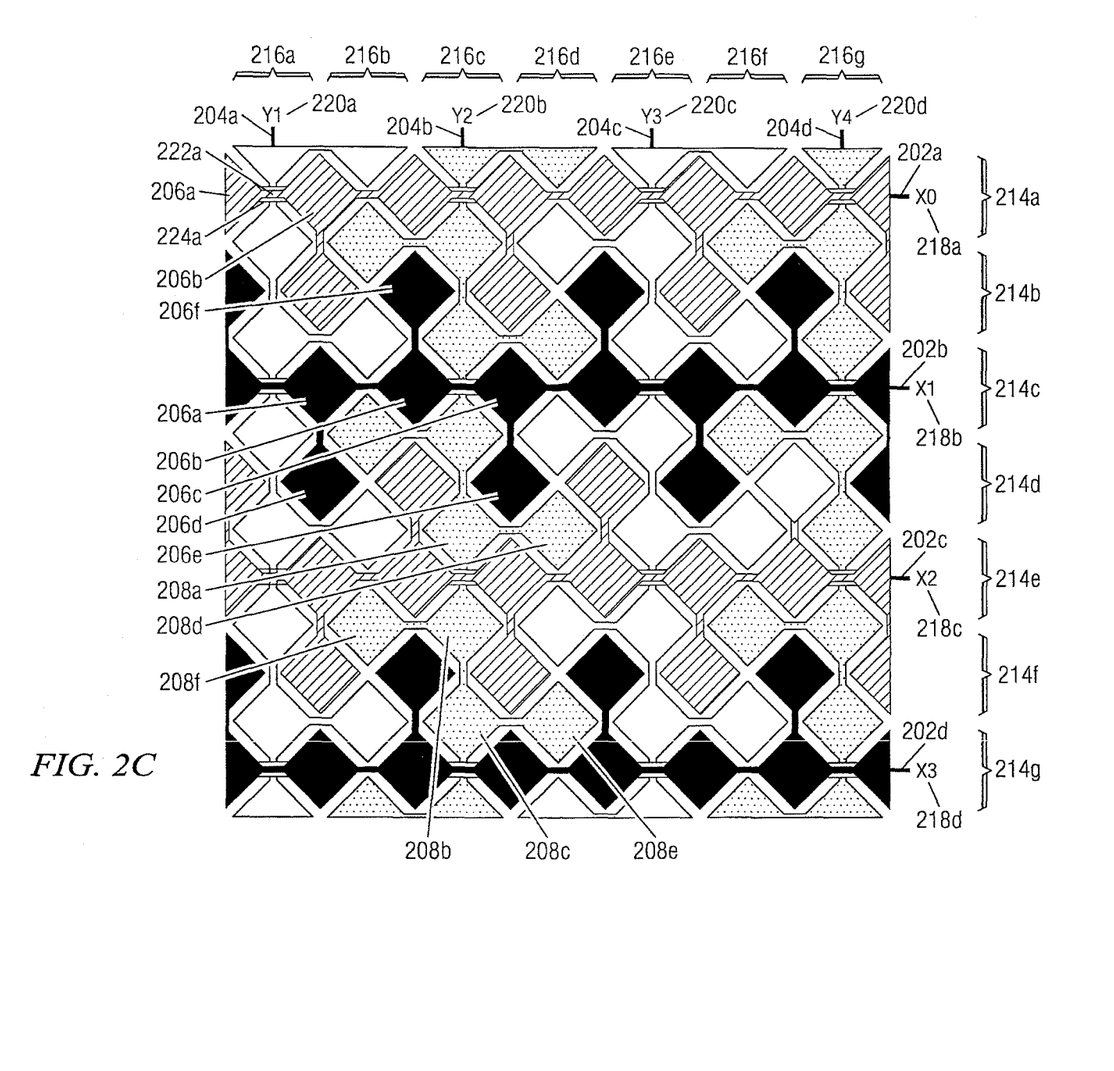

FIGS. 2A, 2B, and 2C illustrate separate and combined electrodes of a touch sensor 200, according to certain embodiments of the present disclosure. FIG. 2A illustrates a first set of electrodes in drive lines 202. FIG. 2B illustrates a second set of electrodes in sense lines 204. FIG. 2C illustrates a combination of drive lines 202 and sense lines 204 in touch sensor 200. In particular embodiments, touch sensor 200 may be an example of touch sensor 10. Touch sensor 200 may comprise drive lines 202a-d that run horizontally and sense lines 204a-d that run vertically. It should be understood that the terms "vertically" and "horizontally" are used merely for ease of description. The present disclosure contemplates any suitable orientation, according to particular needs. Drive lines 202a-d and sense lines 204a-d may include drive electrodes 206 and sense electrodes 208, respectively. Although touch sensor 200 is illustrated as including particular components in a particular configuration, these components and that configuration are provided for example purposes only.

Each drive line 202 may include a plurality of drive electrodes. For example, drive line 202b includes drive electrodes 206a-f. Each sense line 204 may include a plurality of sense electrodes 208. For example, sense line 204b includes sense electrodes 208a-f. In particular embodiments, drive electrodes 206 and sense electrodes 208 of touch sensor 200 may comprise conductive material having any suitable shape, such as for example, a diamond, disc, square, rectangle, snowflake, another shape, or any suitable combination of the preceding.

In the illustrated example, each drive line 202 may include drive electrodes 206 in up to three rows 214 of touch sensor 200. For example, drive line 202b includes drive electrodes 206 in rows 214b-d. Drive lines 202 may include consecutive drive electrodes 206 in a first row 214 and alternating drive electrodes 206 in one or more other rows 214 adjacent to the first row 214. For example, drive line 202b includes consecutive drive electrodes 206a-c in row 214c and includes alternating drive electrodes 206d-e and 206f in rows 214d and 214b, respectively. Drive electrode 206d is adjacent drive electrode 206a, drive electrode 206f is adjacent drive electrode 206b, and drive electrode 206e is adjacent drive electrode 206c. As another example, drive line 202a includes, in row 214a, consecutive drive electrodes 206 and includes, in row 214b, one drive electrode 206 adjacent every other drive electrode 206 in row 214a. This pattern of alternating drive electrodes 206 results in interpolation and may provide one or more technical advantages, including enabling touch screen 200 to detect finer patterns with improved linearity. Although drive lines 202 are illustrated as including particular components in a particular configuration, these components and that configuration are provided for example purposes only. For example, although drive lines 202 are illustrated as including drive electrodes 206 in up to three rows 214 of touch sensor 200, the present disclosure contemplates drive lines 202 including drive electrodes 206 in up to three or more rows 214 of touch sensor 200, according to particular needs.

In the illustrated example, each sense line 204 may include sense electrodes 208 in up to three columns 216 of touch sensor 200. For example, sense line 204b includes sense electrodes 208 in columns 216b-d. Sense lines 204 may include consecutive sense electrodes 208 in a first column 216 and alternating sense electrodes 208 in one or more other columns 216. For example, sense line 204b includes consecutive sense electrodes 208a-c in column 216c and includes alternating sense electrodes 208d-e and 208f in rows 214d and 214b, respectively. Sense electrode 208d is adjacent drive electrode 208a, sense electrode 208f is adjacent sense electrode 208b, and sense electrode 208e is adjacent sense electrode 208c. As another example, sense line 204a includes, in column 216a, consecutive sense electrodes 208 and includes, in column 216b, one sense electrode 208 adjacent every other sense electrode 208 of column 216a. This pattern of alternating sense electrodes 208 results in interpolation and may provide one or more technical advantages, including enabling touch screen 200 to detect finer patterns with improved linearity. Although sense lines 204 are illustrated as including particular components in a particular configuration, these components and that configuration are provided for example purposes only. For example, although sense lines 204 are illustrated as including sense electrodes 208 in up to three columns 216 of touch sensor 200, the present disclosure contemplates sense lines 204 including sense electrodes 208 in up to three or more columns 216 of touch sensor 200, according to particular needs.

Drives lines 202 may be associated with x-coordinates 218 and sense lines 204 may be associated with y-coordinates 220 based on their positions in touch sensor 200. For example, drive lines 202a, 202b, 202c, and 202d may be associated with x-coordinates "X0" 218a, "X1" 218b, "X2" 218c, and "X3" 218d, respectively, and sense lines 204a, 204b, 204c, and 204d may be associated with y-coordinates "Y0" 220a, "Y1" 220b, "Y2" 220c, and "Y3" 220d, respectively.

Crossovers 222 may connect adjacent drive electrodes 206 where a drive line 202 intersects a sense line 204. Insulators 224 may be positioned between crossovers 222 and sense lines 204. For example, crossover 222a may couple drive electrodes 206g and 206h where drive line 202a intersects sense line 204a. Insulator 224a may be positioned between crossover 222a and sense line 204a. Crossovers 222 may be composed of ITO, metal, or any other suitable material. Insulators 224 may be composed of any suitable insulating material. The pattern of electrodes in the illustrated example may result in a reduction in the number of crossovers 222, which may provide one or more technical advantages including, for example, improved yield and reduction in material.

The components of touch sensor 200 may have any suitable number and configuration of layers. In the illustrated example, touch sensor 200 is implemented in a coplanar design with drive electrodes 206 and sense electrodes 208 essentially on the same layer of substrate material. Crossovers 222 are at least partially in a separate plane from drive electrodes 206 and sense electrodes 208 with insulators 224 being positioned between corresponding crossovers 222 and sense lines 204. In alternative embodiments, touch sensor 200 may be implemented in a dual-layer design or any other suitable design.

The components of touch sensor 200 may have any suitable dimensions. For example, in the illustrated example, drive electrodes 206 have a width of 2 mm. In alternative embodiments of touch sensor 200, drive electrodes 206 may have widths of 1.5 mm, 2.5 mm, 3.5 mm, or any other suitable size. In the illustrated example, sense electrodes 208 have a width of 5 mm. In alternative embodiments, sense electrodes 208 may have a width of 3.5 mm, 4.5 mm, 6 mm, or any other suitable size.

Certain embodiments of the present disclosure may provide one or more technical advantages. For example, certain embodiments may provide improved optical performance, free-space performance, and/or moisture performance. The illustrated embodiment, as just one example, may minimize retransmission effects and minimize capacitance between electrodes. The pattern of alternating drive electrodes 206 and sense electrodes 208 provides interpolation and may provide one or more technical advantages, possibly including enabling touch screen 200 to detect finer patterns with improved linearity. Certain embodiments may have a reduced number of crossovers, which, for example, may result in improved yield and reduction in material.

In certain embodiments, a portion or all of touch sensor 200 illustrated in FIGS. 2A, 2B, and 2C is implemented using ITO. Additionally or alternatively, in certain embodiments a portion or all of touch sensor 200 is implemented using one or more other suitable materials, such as FLM.

Figure 3:
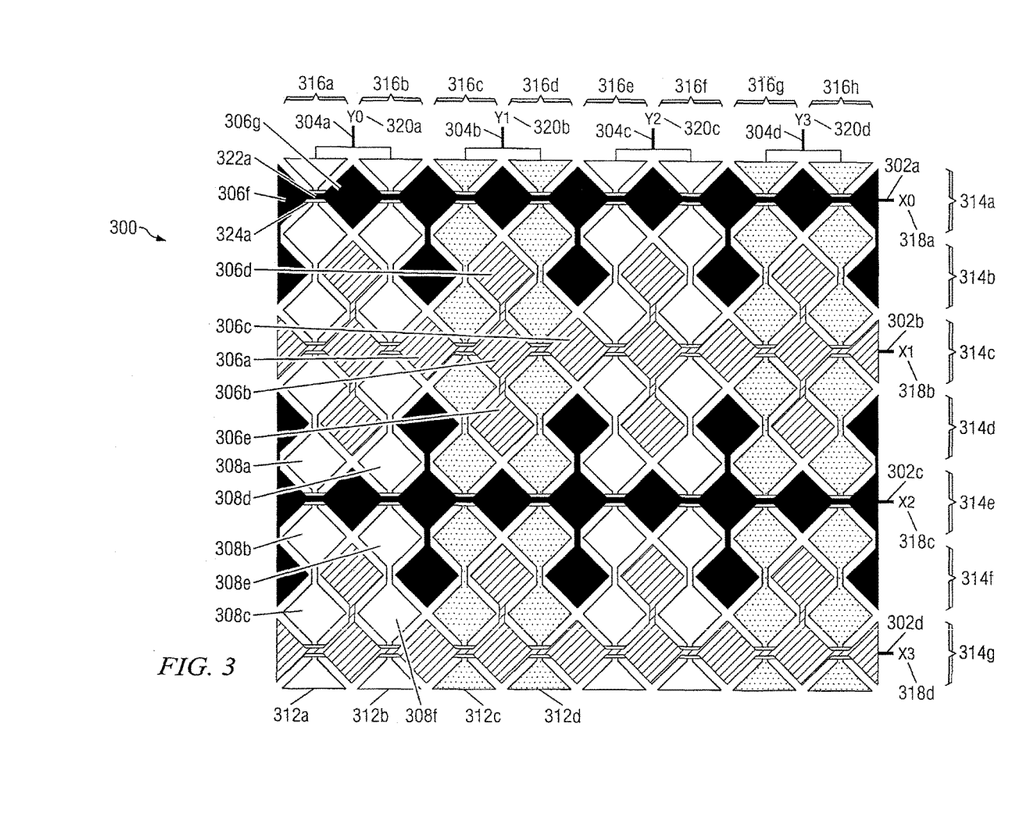
FIG. 3 illustrates combined electrodes of a touch sensor with an alternative arrangement of electrodes, according to certain embodiments of the present disclosure.

FIG. 3 illustrates combined electrodes of a touch sensor 300 with an alternative arrangement of electrodes, according to certain embodiments of the present disclosure. In particular embodiments, touch sensor 300 may be an example of touch sensor 10. Touch sensor 300 may comprise drive lines 302a-d that run horizontally and sense lines 304a-d that run vertically. It should be understood that the terms "vertically" and "horizontally" are used merely for ease of description. The present disclosure contemplates any suitable orientation, according to particular needs. Drive lines 302a-d and sense lines 304a-d may include drive electrodes 306 and sense electrodes 308, respectively. Although touch sensor 300 is illustrated as including particular components in a particular configuration, these components and that configuration are provided for example purposes only.

Each drive line 302 may include a plurality of drive electrodes 306. For example, drive line 302b includes drive electrodes 306a-e. Each sense line 304 includes a plurality of electrically-coupled, parallel sense-line segments 312. Each sense-line segment 312 includes sense electrodes 308. For example, sense-line segment 312a of sense line 304a includes sense electrodes 308a-c. In particular embodiments, drive electrodes and sense electrodes of touch sensor 200 may comprise conductive material having any suitable shape, such as for example, a diamond, disc, square, rectangle, snowflake, another shape, or any suitable combination of the preceding.

In the illustrated example, each drive line 302 may include drive electrodes 306 in up to three rows 314 of touch sensor 300. For example, drive line 302b includes drive electrodes 306 in rows 314b-d. Drive lines 302 may include consecutive drive electrodes 306 in a first row 314 and, for every other drive electrode 306 of the first row 314, drive electrodes 306 in one or more other rows 314. For example, drive line 302b includes consecutive drive electrodes 306a-c in row 314c and includes drive electrodes 306d and 306e in rows 314b and 314d, respectively. Drive electrodes 306d-3 are each adjacent drive electrode 306b. As another example, drive line 302a includes, in row 314a, consecutive drive electrodes 306 and includes, in row 314b, a drive electrode 306 adjacent each other drive electrode 308 of row 314a. This pattern of drive electrodes 306 results in interpolation and may provide one or more technical advantages, including enabling touch screen 300 to detect finer patterns with improved linearity. Although drive lines 302 are illustrated as including particular components in a particular configuration, these components and that configuration are provided for example purposes only. For example, although drive lines 302 are illustrated as including drive electrodes 306 in up to three rows 314 of touch sensor 300, the present disclosure contemplates drive lines 302 including drive electrodes 306 in up to three or more rows 314 of touch sensor 300, according to particular needs.

In the illustrated example, each sense line 304 may include a plurality of electrically-coupled, parallel sense-line segments 312. For example, sense line 304a may include sense-line segments 312a-b, where each sense-line segment 312 includes sense electrodes 308. For example, sense line 304a includes consecutive sense electrodes 306a-c in column 316a and includes consecutive sense electrodes 308d-f in column 316b. Sense electrode 308d is adjacent drive electrode 308a, sense electrode 308e is adjacent sense electrode 308b, and drive electrode 308f is adjacent drive electrode 308c. As another example, sense line 304b includes sense-line segments 312c-d, where each sense-line segment 312 includes sense electrodes 308. Although sense lines 304 are illustrated as including particular components in a particular configuration, these components and that configuration are provided for example purposes only.

In particular embodiments, drive electrodes and sense electrodes of touch sensor 300 may comprise conductive material having any suitable shape, such as for example, a diamond, disc, square, rectangle, snowflake, another shape, or any suitable combination of the preceding.

Drives lines 302 may be associated with x-coordinates 318 and sense lines 304 may be associated with y-coordinates 320 based on their positions in touch sensor 300. For example, drive lines 302a, 302b, 302c, and 302d may be associated with x-coordinates "X0" 318a, "X1" 318b, "X2" 318c, and "X3" 318d, respectively, and sense lines 304a, 304b, 304c, and 304d may be associated with y-coordinates "Y0" 320a, "Y1" 320b, "Y2" 320c, and "Y3" 320d, respectively.

Crossovers 322 may connect adjacent drive electrodes 306 where a drive line 302 intersects a sense-line segment 312. Insulators 324 may be positioned between crossovers 322 and sense-line segments 312. For example, crossover 322a may couple drive electrodes 306f and 306g where drive line 302a intersects sense-line segment 312a. Insulator 324a may be positioned between crossover 322a and sense-line segment 312a. Crossovers 322 may be composed of ITO, metal, or any other suitable material. Insulators 324 may be composed of any suitable insulating material. The pattern of electrodes in the illustrated example may result in a reduction in the number of crossovers 322, which may provide one or more technical advantages including, for example, improved yield and reduction in material.

The components of touch sensor 300 may have any suitable number and configuration of layers. In the illustrated example, touch sensor 300 is implemented in a coplanar design with drive electrodes 306 and sense electrodes 308 essentially on the same layer of substrate material. Crossovers 322 are at least partially in a separate plane from drive electrodes 306 and sense electrodes 308 with insulators 324 being positioned between corresponding crossovers 322 and sense lines 304. In alternative embodiments, touch sensor 300 may be implemented in a dual-layer design or any other suitable design.

The components of touch sensor 300 may have any suitable dimensions. For example, in the illustrated example, drive electrodes 306 have a width of 2 mm. In alternative embodiments of touch sensor 300, drive electrodes 306 may have widths of 1.5 mm, 2.5 mm, 3.5 mm, or any other suitable size. In the illustrated example, sense electrodes 308 have a width of 5 mm. In alternative embodiments, sense electrodes 308 may have a width of 3.5 mm, 4.5 mm, 6 mm, or any other suitable size.

Certain embodiment of the present disclosure may provide one or more technical advantages. For example, certain embodiment may provide improved optical performance, free-space performance, and/or moisture performance. The illustrated embodiment, as just one example, may minimize retransmission effects and minimize capacitance between electrodes. The pattern of alternating drive electrodes 306 provides interpolation and may provide one or more technical advantages, possibly including enabling touch screen 300 to detect finer patterns with improved linearity. Certain embodiments may have a reduced number of crossovers, which, for example, may result in improved yield and reduction in material.

In certain embodiments, a portion or all of touch sensor 300 illustrated in FIG. 3 is implemented using ITO. Additionally or alternatively, in certain embodiments a portion or all of touch sensor 300 is implemented using one or more other suitable materials, such as FLM.

Figure 4:
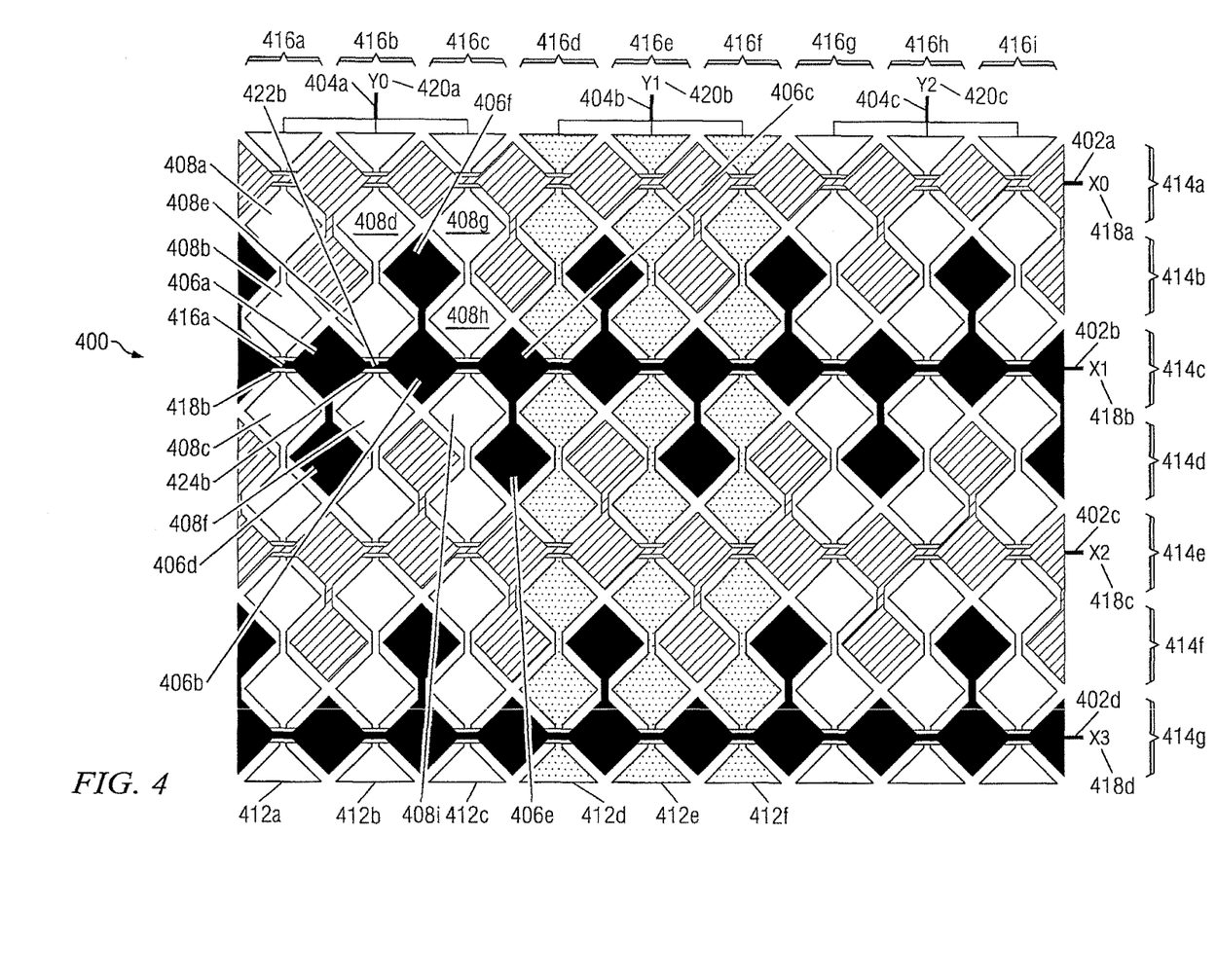
FIG. 4 illustrates combined electrodes of a touch sensor with an alternative arrangement of electrodes, according to certain embodiments of the present disclosure.

FIG. 4 illustrates combined electrodes of a touch sensor 400 with an alternative arrangement of electrodes, according to certain embodiments of the present disclosure. In particular embodiments, touch sensor 400 may be an example of touch sensor 10. Touch sensor 400 may comprise drive lines 402a-d that run horizontally and sense lines 404a-c that run vertically. It should be understood that the terms "vertically" and "horizontally" are used merely for ease of description. The present disclosure contemplates any suitable orientation, according to particular needs. Drive lines 402a-d and sense lines 404a-c may include drive electrodes 406 and sense electrodes 408, respectively. Although touch sensor 400 is illustrated as including particular components in a particular configuration, these components and that configuration are provided for example purposes only.

Each drive line 402 may include a plurality of drive electrodes 406. For example, drive line 402b includes drive electrode 406a-f. Each sense line 404 includes a plurality of electrically-coupled, parallel sense-line segments 412. Each sense-line segment 412 includes sense electrodes 408. For example, sense-line segment 412a of sense line 404a includes sense electrodes 408a-c. In particular embodiments, drive electrodes and sense electrodes of touch sensor 400 may comprise conductive material having any suitable shape, such as for example, a diamond, disc, square, rectangle, snowflake, another shape, or any suitable combination of the preceding.

In the illustrated example, each drive line 402 may include drive electrodes 406 in up to three rows 414 of touch sensor 400. For example, drive line 402b includes drive electrodes 406 in rows 414b-d. Drive lines 402 may include consecutive drive electrodes 406 in a first row 414 and alternating drive electrodes 406 in one or more other rows 414. For example, drive line 402b includes consecutive drive electrodes 406a-c in row 414c and includes alternating drive electrodes 406d-e and 406f in rows 414d and 414b, respectively. Drive electrode 406d is adjacent drive electrode 406a, drive electrode 406f is adjacent drive electrode 406b, and drive electrode 406e is adjacent drive electrode 406c. As another example, drive line 402a includes, in row 414a, consecutive drive electrodes 406 and includes, in row 414b, one drive electrode 406 adjacent every other drive electrode 406 of row 414a. This pattern of alternating drive electrodes 406 results in interpolation and may provide one or more technical advantages, including enabling touch screen 400 to detect finer patterns with improved linearity. Although drive lines 402 are illustrated as including particular components in a particular configuration, these components and that configuration are provided for example purposes only. For example, although drive lines 402 are illustrated as including drive electrodes 406 in up to three rows 414 of touch sensor 400, the present disclosure contemplates drive lines 402 including drive electrodes 406 in up to three or more rows 414 of touch sensor 400, according to particular needs.

In the illustrated example, each sense line 404 may include a plurality of electrically-coupled, parallel sense-line segments 412. For example, sense line 404a may include sense-line segments 412a-c, where each sense-line segment 412 includes sense electrodes 408. For example, sense line 404a includes consecutive sense electrodes 408a-c in sense-line segment 412a and column 416a, consecutive sense electrodes 308d-f in sense-line segment 412b and column 416b, and consecutive sense electrodes 308g-i in sense-line segment 412c and column 416c. Sense electrodes 408a, 408b, and 408c are adjacent sense electrodes 408d, 408e, and 408f, respectively. Sense electrodes 408g, 408h, and 408i are adjacent sense electrodes 408d, 408e, and 408f, respectively. As another example, sense line 404b includes sense-line segments 312d-f, where each sense-line segment 412 includes sense electrodes 408. Although sense lines 404 are illustrated as including particular components in a particular configuration, these components and that configuration are provided for example purposes only. For example, although each sense line 404 is illustrated as including three sense-line segments 412, the present disclosure contemplates sense lines 404 including any suitable number of sense-line segments 412, according to particular needs.

Drives lines 402 may be associated with x-coordinates 418 and sense lines 404 may be associated with y-coordinates 420 based on their positions in touch sensor 400. For example, drive lines 402a, 402b, 402c, and 402d may be associated with x-coordinates "X0" 418a, "X1" 418b, "X2" 418c, and "X3" 418d, respectively, and sense lines 404a, 404b, and 404c may be associated with y-coordinates "Y0" 420a, "Y1" 420b, and "Y2" 420c, respectively.

Crossovers 422 may connect adjacent drive electrodes 406 where a drive line 402 intersects a sense-line segment 412. Insulators 424 may be positioned between crossovers 422 and sense-line segments 412. For example, crossover 422b may couple drive electrodes 406a and 406b where drive line 402b intersects sense-line segment 412b. Insulator 424b may be positioned between crossover 422a and sense-line segment 412b. Crossovers 422 may be composed of ITO, metal, or any other suitable material. Insulators 424 may be composed of any suitable insulating material. The pattern of electrodes in the illustrated example may result in a reduction in the number of crossovers 422, which may provide one or more technical advantages including, for example, improved yield and reduction in material.

The components of touch sensor 400 may have any suitable number and configuration of layers. In the illustrated example, touch sensor 400 is implemented in a coplanar design with drive electrodes 406 and sense electrodes 408 essentially on the same layer of substrate material. Crossovers 422 are at least partially in a separate plane from drive electrodes 406 and sense electrodes 408 with insulators 424 being positioned between corresponding crossovers 422 and sense lines 404. In alternative embodiments, touch sensor 400 may be implemented in a dual-layer design or any other suitable design.

The components of touch sensor 400 may have any suitable dimensions. For example, in the illustrated example, drive electrodes 406 have a width of 2 mm. In alternative embodiments of touch sensor 400, drive electrodes 406 may have widths of 1.5 mm, 2.5 mm, 3.5 mm, or any other suitable size. In the illustrated example, sense electrodes 408 have a width of 5 mm. In alternative embodiments, sense electrodes 408 may have a width of 3.5 mm, 4.5 mm, 6 mm, or any other suitable size.

Certain embodiments of the present disclosure may provide one or more technical advantages. For example, certain embodiments may provide improved optical performance, free-space performance, and/or moisture performance. The illustrated embodiment, for example, may minimize retransmission effects and minimize capacitance between electrodes. The pattern of alternating drive electrodes 406 provides interpolation and may provide one or more technical advantages, possibly including enabling touch screen 200 to detect finer patterns with improved linearity. Certain embodiments may have a reduced number of crossovers, which, for example, may result in improved yield and reduction in material.

In certain embodiments, a portion or all of touch sensor 400 illustrated in FIG. 4 is implemented using ITO. Additionally or alternatively, in certain embodiments a portion or all of touch sensor 400 is implemented using one or more other suitable materials, such as FLM.

Figure 5:
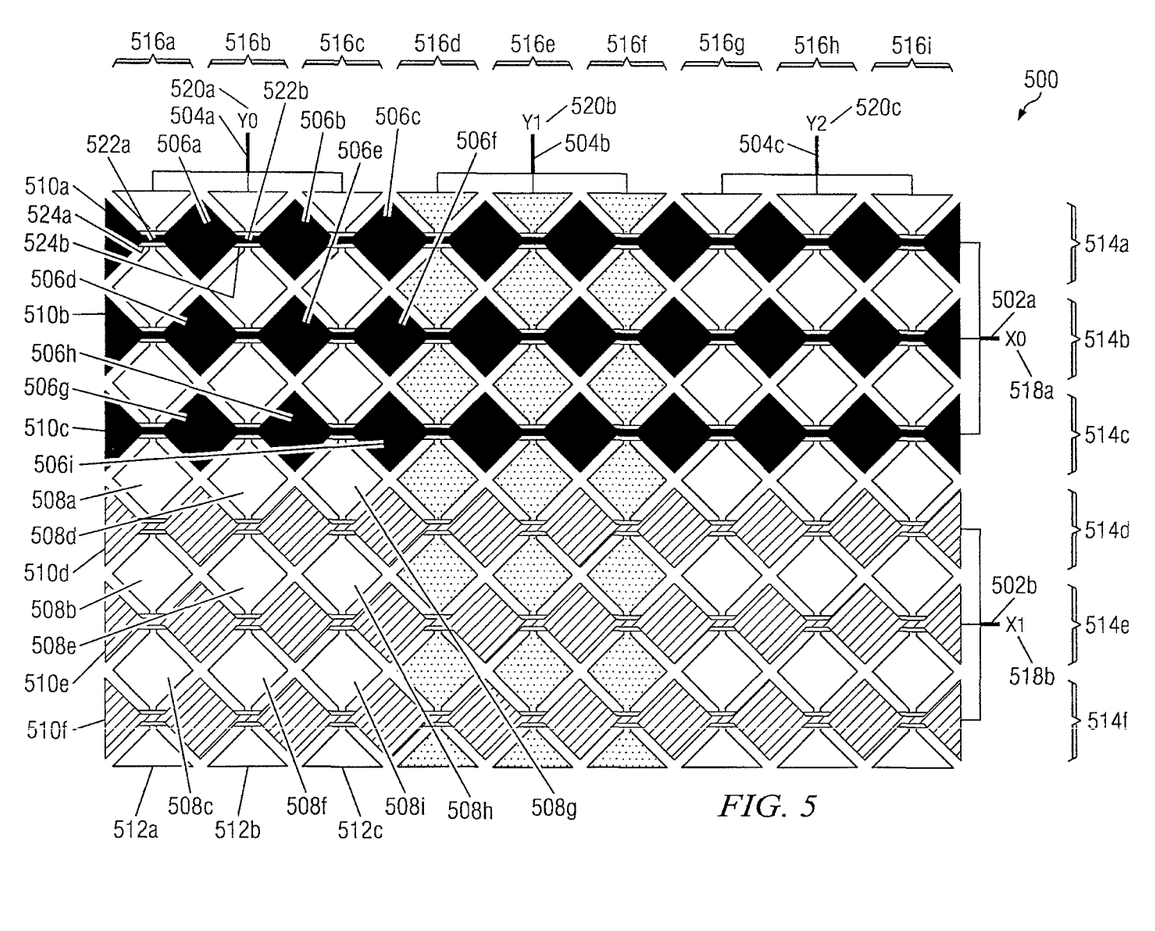
FIG. 5 illustrates combined electrodes of a touch sensor with an alternative arrangement of electrodes, according to certain embodiments of the present disclosure.

FIG. 5 illustrates combined electrodes of a touch sensor 500 with an alternative arrangement of electrodes, according to certain embodiments of the present disclosure. In particular embodiments, touch sensor 500 may be an example of touch sensor 10. Touch sensor 500 may comprise drive lines 502a-b that run horizontally and sense lines 504a-c that run vertically. It should be understood that the terms "vertically" and "horizontally" are used merely for ease of description. The present disclosure contemplates any suitable orientation, according to particular needs. Drive lines 502a-b and sense lines 504a-c may include drive electrodes 506 and sense electrodes 508, respectively. Although touch sensor 500 is illustrated as including particular components in a particular configuration, these components and that configuration are provided for example purposes only.

Each drive line 502 may include a plurality of electrically-coupled, parallel drive-line segments 510. Each drive-line segment 510 includes a plurality of drive electrodes. For example, drive-line segment 510c of drive line 502a includes drive electrode 506. Each sense line 504 includes a plurality of electrically-coupled, parallel sense-line segments 512. Each sense-line segment 512 includes sense electrodes 508. For example, sense-line segment 512a of sense line 504a includes sense electrodes 508a-c. In particular embodiments, drive electrodes 506 and sense electrodes 508 of touch sensor 500 may comprise conductive material having any suitable shape, such as for example, a diamond, disc, square, rectangle, snowflake, another shape, or any suitable combination of the preceding.

In the illustrated example, each drive line 502 may include a plurality of electrically-coupled, parallel drive-line segments 510. For example, drive line 502a may include drive-line segments 510a-c, where each drive-line segment 510 includes a plurality of drive electrodes 506. For example, drive line 502a includes consecutive drive electrodes 506a-c in drive-line segment 510a and row 514a, consecutive drive electrodes 506d-f in drive-line segment 510b and row 514b, and consecutive drive electrodes 506g-i in drive-line segment 510c and row 514c. Drive electrodes 506a, 506b, and 506c are adjacent drive electrodes 506d, 506e, and 506f, respectively. Drive electrodes 506g, 506h, and 506i are adjacent drive electrodes 506d, 506e, and 506f, respectively. As another example, drive line 502b includes drive-line segments 510d-f, where each drive-line segment 510 includes a plurality of drive electrodes 506. Although drive lines 502 are illustrated as including particular components in a particular configuration, these components and that configuration are provided for example purposes only. For example, although each drive line 502 is illustrated as including three sense-line segments 510, the present disclosure contemplates drive lines 502 including any suitable number of drive-line segments 510, according to particular needs.

In the illustrated example, each sense line 504 may include a plurality of electrically-coupled, parallel sense-line segments 512. For example, sense line 504a includes sense-line segments 512a-c, where each sense-line segment 512 includes a plurality of sense electrodes 508. For example, sense line 504a may include consecutive sense electrodes 508a-c in sense-line segment 512a and column 516a, consecutive sense electrodes 508d-f in sense-line segment 512b and column 516b, and consecutive sense electrodes 508g-i in sense-line segment 512c and column 516c. Sense electrodes 508a, 508b, and 508c are adjacent sense electrodes 508d, 508e, and 508f, respectively. Sense electrodes 508g, 508h, and 508i are adjacent sense electrodes 508d, 508e, and 508f, respectively. As another example, sense line 504b includes sense-line segments 512d-f, where each sense-line segment 512 includes a plurality of sense electrodes 508. Although sense lines 504 are illustrated as including particular components in a particular configuration, these components and that configuration are provided for example purposes only. For example, although each sense line 504 is illustrated as including three sense-line segments 512, the present disclosure contemplates sense lines 504 including any suitable number of sense-line segments 512, according to particular needs.

Drives lines 502 may be associated with x-coordinates 518 and sense lines 504 may be associated with y-coordinates 520 based on their positions in touch sensor 500. For example, drive lines 502a and 502b may be associated with x-coordinates "X0" 518a and "X1" 518b, respectively, and sense lines 504a, 504b, and 504c may be associated with y-coordinates "Y0" 520a, "Y1" 520b, and "Y2" 520c, respectively.

Crossovers 522 may connect adjacent drive electrodes where a drive-line segment 510 intersects a sense-line segment 512. Insulators 524 may be positioned between crossovers 522 and sense-line segments 512. For example, crossover 522b may couple drive electrodes 506a and 506b where drive-line segment 510a intersects sense-line segment 512b. Insulator 524b may be positioned between crossover 522b and sense-line segment 512b. Crossovers 522 may be composed of ITO, metal, or any other suitable material. Insulators 524 may be composed of any suitable insulating material.

The components of touch sensor 500 may have any suitable number and configuration of layers. In the illustrated example, touch sensor 500 is implemented in a coplanar design with drive electrodes 506 and sense electrodes 508 essentially on the same layer of substrate material. Crossovers 522 are at least partially in a separate plane from drive electrodes 506 and sense electrodes 508 with insulators 524 being positioned between corresponding crossovers 522 and sense lines 504. In alternative embodiments, touch sensor 500 may be implemented in a dual-layer design or any other suitable design.

The components of touch sensor 500 may have any suitable dimensions. For example, in the illustrated example, drive electrodes 506 have a width of 2 mm. In alternative embodiments of touch sensor 500, drive electrodes 506 may have widths of 1.5 mm, 2.5 mm, 3.5 mm, or any other suitable size. In the illustrated example, sense electrodes 508 have a width of 5 mm. In alternative embodiments, sense electrodes 508 may have a width of 3.5 mm, 4.5 mm, 6 mm, or any other suitable size.

Certain embodiments of the present disclosure may provide one or more technical advantages. For example, certain embodiments may provide improved optical performance, free-space performance, and/or moisture performance. The illustrated example, as just one example, may minimize retransmission effects and minimize capacitance between electrodes.

In certain embodiments, a portion or all of touch sensor 500 illustrated in FIG. 5 is implemented using ITO. Additionally or alternatively, in certain embodiments a portion or all of touch sensor 400 is implemented using one or more other suitable materials, such as FLM.

Modifications, additions, or omissions may be made to the touch sensors of FIGS. 2A-5 without departing from the scope of the invention. For example, each of the touch sensors illustrated may be implemented in single or in multiple layers, where appropriate. Additionally, the touch sensors illustrated in FIGS. 2A, 2B, 2C, 3, 4, and 5 may be implemented using ITO. Additionally or alternatively, in certain embodiments, any of these touch sensors may be constructed in FLM or any other suitable material. In certain embodiments, the electrode patterns of the touch sensors contemplated by this disclosure may be made from one layer of ITO formed on one side of a substrate. In these embodiments, for example, the interconnects may be made using small metal or ITO bridges insulated from the sensor ITO layer by a thick insulator material. In addition, some of the electrode patterns of the touch sensors contemplated by this disclosure may be made from two layers of ITO where the complete pattern is split over the two layers. These embodiments may forego the use of ITO bridges.

As another example, techniques applied to only sense electrodes may also be applied to drive electrodes. Likewise, techniques applied to only drive electrodes may also be applied to sense electrodes. For example, the arrangement of the drive lines as shown in the embodiments of FIG. 3 can be applied to sense lines in particular embodiments. Additionally, references to "parallel" and/or "perpendicular" components may be substantially parallel or substantially perpendicular due to any applicable circumstance, such as process variation during construction of any of the touch sensors described herein.

Moreover, the embodiments described in FIGS. 2A-5 may be combined in any suitable fashion. For example, a touch sensor may have drive lines arranged as shown in FIG. 3 and sense lines arranged as shown in FIGS. 2B-C. Furthermore, all the drive lines for a particular touch sensor do not have to be the same. Rather, each drive line may have a unique configuration employing any of the techniques discussed herein. The same applies to the sense lines for a particular touch sensor.

Figure 6:
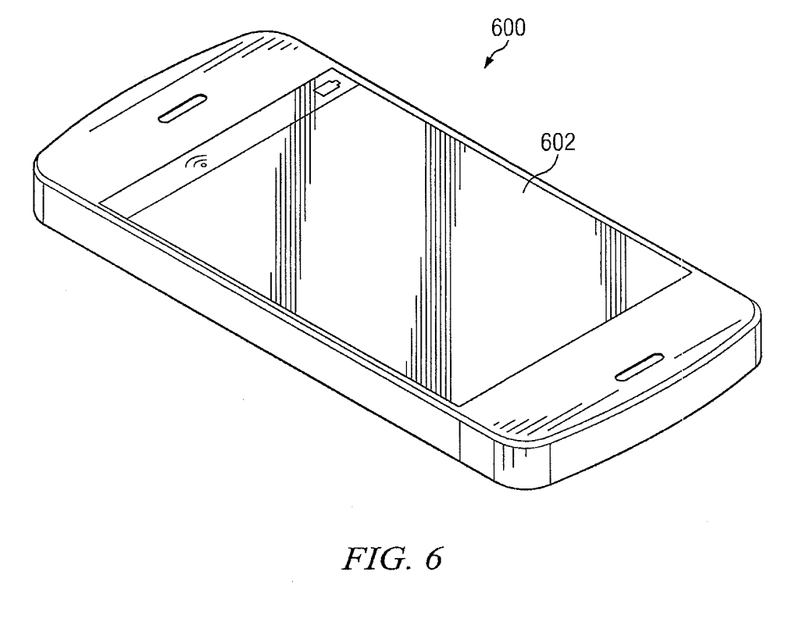
FIG. 6 illustrates a device that may incorporate any of the touch sensors and electrode patterns of FIGS. 1-5, according to certain embodiments of the present disclosure.

FIG. 6 illustrates a device 600 that may incorporate any of the touch sensors and electrode patterns of FIGS. 1-5, according to certain embodiments of the present disclosure. Device 600 may include, by way of example and not limitation, a desktop computer, laptop computer, tablet computer, personal digital assistant (PDA), Smartphone, satellite navigation device, telephone, cell phone, portable media player, portable game console, kiosk computer, point-of-sale device, household appliance, automatic teller machine (ATM), any other device, or any combination of the preceding.

According to the illustrated embodiment, device 600 includes a touch-screen display 602. Touch-screen display 602 enables the touch screen to present a wide variety of data, including a keyboard, a numeric keypad, program or application icons, and various other interfaces as desired. A user may interact with device 600 by touching touch screen display 602 with a single finger (or any other object), such as to select a program for execution or to type a letter on a keyboard displayed on the touch screen display 602. In addition, the user may use multiple touches, such as to zoom in or zoom out when viewing a document or image, or single touches, where appropriate. In particular embodiments of device 600, such as home appliances, touch screen display 602 may not change or may change only slightly during device operation, and may recognize only single touches.

Certain embodiments of the present disclosure may provide one or more technical advantages. In certain embodiments, patterns of drive and sense electrodes may increase interpolation and enable touch screens to detect finer patterns with improved linearity. Certain embodiments may provide improved optical performance, free-space performance, and/or moisture performance. Certain embodiments may minimize retransmission effects and/or minimize capacitance between electrodes. In certain embodiments, one technical advantage may be a reduction in the number of crossovers, which, for example, may result in improved yield and reduction in material.

Certain embodiments of the invention may include none, some, or all of the above technical advantages. One or more other technical advantages may be readily apparent to one skilled in the art from the figures, descriptions, and claims included herein.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, where appropriate, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor, comprising:
   a substrate; and
   a plurality of electrodes disposed on the substrate, the plurality of electrodes comprising first and second drive lines each comprising a plurality of drive electrodes and a first sense line comprising a plurality of sense electrodes;
   wherein the first drive line comprises:
      a first row of electrodes comprising a first drive electrode, a second drive electrode, and a third drive electrode, the second drive electrode being between and connected to the first drive electrode and the third drive electrode;
      a second row of electrodes adjacent the first row of electrodes and comprising a fourth drive electrode adjacent and connected to the first drive electrode and a fifth drive electrode adjacent and connected to the third drive electrode; and
      a third row of electrodes adjacent the first row of electrodes and comprising a sixth drive electrode adjacent and connected to the second drive electrode;
   wherein the second drive line comprises:
      a first row of electrodes comprising a first drive electrode, a second drive electrode, and a third drive electrode, the first drive electrode of the second drive line being adjacent to the fourth drive electrode of the first drive line, the third drive electrode of the second drive line being adjacent to the fifth drive electrode of the first drive line, the second drive electrode of the second drive line being between and connected to the first drive electrode of the second drive line and the third drive electrode of the second drive line; and
- a second row of electrodes adjacent the first row of electrodes of the second drive line and comprising a fourth drive electrode adjacent and connected to the second drive electrode of the second drive line, the fourth drive electrode of the second drive line being adjacent to the second drive electrode of the first drive line and between the fourth drive electrode of the first drive line and the fifth drive electrode of the first drive line;

wherein one or more of the plurality of sense electrodes of the first sense line are each positioned in a respective space formed, in plan view, by electrodes of both the first and second drive lines, the first row of electrodes of the first drive line being separated at a first location along the first row of electrodes of the first drive line from the first row of electrodes of the second drive line at a respective first location along the first row of electrodes of the second drive line by two sense electrodes of the first sense line, the two sense electrodes of the first sense line arranged in a first column of electrodes and being a first sense electrode and a second sense electrode adjacent and connected to the first sense electrode, the first row of electrodes of the first drive line separated from the first row of electrodes of the second drive line by a distance spanning at least both the first sense electrode and the second sense electrode of the first column of electrodes of the first sense line;

wherein the first sense line comprises:
- the first column of electrodes comprising the first sense electrode, the second sense electrode, and a third sense electrode, the second sense electrode being between and connected to the first sense electrode and the third sense electrode;
- a second column of electrodes adjacent the first column of electrodes and comprising a fourth sense electrode adjacent and connected to the first sense electrode and a fifth sense electrode adjacent and connected to the third sense electrode; and
- a third column of electrodes adjacent the first column of electrodes and comprising a sixth sense electrode adjacent and connected to the second sense electrode; and wherein:
- the first sense electrode of the first sense line is positioned in a space formed, in plan view, by the first drive electrode of the second drive line, the second drive electrode of the second drive line, the fourth drive electrode of the second drive line, and the fourth drive electrode of the first drive line;
- the second sense electrode of the first sense line is positioned in a space formed, in plan view, by the fourth drive electrode of the first drive line, the fourth drive electrode of the second drive line, the second drive electrode of the first drive line, and the first drive electrode of the first drive line;
- the sixth sense electrode of the first sense line is positioned in a space formed, in plan view, by the fourth drive electrode of the second drive line, the fith drive electrode of the, first drive line, the third drive electrode of the first drive line, and the second drive electrode of the first drive line; and
- the plurality of electrodes comprises a second sense line, the first row of electrodes of the first drive line being seperated at a second location along the first row of electrodes of the first drive line from the first row of electrodes of the second drive line at a respective second location along the first row of electrodes of the second drive line by two sense electrodes, the two sense electrodes being the sixth sense electrode of the first sense line and a sense electrode of the second sense line that is adjacent but not connected to the sixth sense electrode of the first sense line, the first row of electrodes of the first drive line separated from the first row of electrodes of the second drive line by a distance spanning at least both the sixth sense electrode of the first sense line and the sense electrode of the second sense line.

2. The touch sensor of claim 1, wherein the second drive line comprises a third row of electrodes comprising a fifth drive electrode and a sixth drive electrode, the fifth drive electrode of the second drive line being adjacent and connected to the first drive electrode of the second drive line, the sixth drive electrode of the second drive line being adjacent and connected to the third drive electrode of the second drive line.

3. The touch sensor of claim 1, wherein:
- the first row of electrodes of the first drive line comprises a seventh electrode and an eighth electrode, the seventh electrode being between and connected to the third drive electrode of the first drive line and the eighth drive electrode of the first drive line;
- the second row of electrodes of the first drive line comprises a ninth drive electrode adjacent and connected to the eighth drive electrode of the first drive line; and
- the third row of electrodes of the first drive line comprises a tenth drive electrode adjacent and connected to the seventh drive electrode of the first drive line.

4. The touch sensor of claim 1, wherein at least one of the plurality of electrodes disposed on the substrate has a diamond pattern.

5. A system comprising:
- a touch sensor, wherein the touch sensor comprises:
  - a substrate; and
  - a plurality of electrodes disposed on the substrate, the plurality of electrodes comprising first and second drive lines each comprising a plurality of drive electrodes and a first sense line comprising a plurality of sense electrodes; and
- a touch-sensor controller operable to apply a voltage to at least one of the plurality of drive electrodes;

wherein the first drive line comprises:
- a first row of electrodes comprising a first drive electrode, a second drive electrode, and a third drive electrode, the second drive electrode being between and connected to the first drive electrode and the third drive electrode;
- a second row of electrodes adjacent the first row of electrodes and comprising a fourth drive electrode adjacent and connected to the first drive electrode and a fifth drive electrode adjacent and connected to the third drive electrode; and
- a third row of electrodes adjacent the first row of electrodes and comprising a sixth drive electrode adjacent and connected. to the second drive electrode;

wherein the second drive line comprises:
- a first row of electrodes comprising a first drive electrode, a second drive electrode, and a third drive electrode, the first drive electrode of the second drive line being adjacent to the fourth drive electrode of the first drive line, the third drive electrode of the second drive line being adjacent to the fifth drive electrode of the first drive line, the second drive electrode of the second drive line being between and connected to the first drive electrode of the second drive line and the third drive electrode of the second drive line; and a second row of electrodes adjacent the first row of electrodes of the second drive line and comprising a fourth drive electrode adjacent and connected to the second drive electrode of the second drive line, the fourth drive electrode of the second drive line being adjacent to the second drive electrode of the first drive line and between the fourth drive electrode of the first drive line and the fifth drive electrode of the first drive line;

wherein one or more of the plurality of sense electrodes of the first sense line are each positioned in a respective space formed, in plan view, by electrodes of both the first and second drive lines, the first row of electrodes of the first drive line being separated at a first location along the first row of electrodes of the first drive line from the first row of electrodes of the second drive line at a respective first location along the first row of electrodes of the second drive line by two sense electrodes of the first sense line, the two sense electrodes of the first sense line arranged in a first column of electrodes and being a first sense electrode and a second sense electrode adjacent and connected to the first sense electrode, the first row of electrodes of the first drive line separated from the first row of electrodes of the second drive line by a distance spanning at least both the first sense electrode and the second sense electrode of the first column of electrodes of the first sense line;

wherein the first sense line comprises:

the first column of electrodes comprising the first snese electode, the second sense electrode, and a third sense electrode, the second sense electrode being between and connected to the first sense electrode and the third sense electrode;

a second column of electrodes adjacent at the first column of electrodes and comprising a fourth sense elctrode adjacent and connected to the first sense electrode and a fifth sense electrode adjacent and connected to the third sense electrode; and a third column of electrodes adjacent the first column of electrodes and comprising a sixth sense electrode adjacent the second sense electrode; and wherein:

the first sense electrode of the first sense line is positioned in a space formed, in plan view, by the first drive electrode of the second drive line, the second drive electrode of the second drive line, the fourth drive electrode of the second drive line, and the fourth drive electrode of the first drive line;

the second sense electrode of the first sense line is positioned in a space formed, in plan view, by the fourth drive electrode of the first drive line, the fourth drive electrode of the second drive line, the second drive electrode of the of the first drive line, and the first drive electrode of the first drive line;

the sixth sense electrode of the first sense line is positioned in a space formed, in plan view, by the fourth drive electrode of the second drive line, the fifth drive electrode of the first drive line, the third drive electrode of the first drive line, and the second drive electrode of the first drive line; and the plurality of electrodes comprises a second sense line, the first row of electrodes of the first drive line being separated at a second location along the first row of electrodes of the first drive line from the first row of electrodes of the second drive line at a respective second location along the first row of electrodes of the second drive line by two sense electrodes, the two sense electrodes being the sixth sense electrode of the first sense line and a sense electrode of the second sense line that is adjacent but not connected to the sixth sense electrode of the first sense line, the first row of electrodes of the first drive line being separated from the first row of electrodes of the second drive line by a distance spanning at least both the sixth sense electrode of the first sense line and the sense electrode of the second sense line.

6. The system of claim 5, wherein the second drive line comprises a third row of electrodes comprising a fifth drive electrode and a sixth drive electrode, the fifth drive electrode of the second drive line being adjacent and connected to the first drive electrode of the second drive line, the sixth drive electrode of the second drive line being adjacent and connected to the third drive electrode of the second drive line.

7. The system of claim 5, wherein:

the first row of electrodes of the first drive line comprises a seventh electrode and an eighth electrode, the seventh electrode being between and connected to the third drive electrode of the first drive line and the eighth drive electrode of the first drive line;

the second row of electrodes of the first drive line comprises a ninth drive electrode adjacent and connected to the eighth drive electrode of the first drive line; and the third row of electrodes of the first drive line comprises a tenth drive electrode adjacent and connected to the seventh drive electrode of the first drive line.

8. The system of claim 5, wherein at least one of the plurality of electrodes disposed on the substrate has a diamond pattern.

9. A device comprising:

a touch sensor, wherein the touch sensor comprises:

a substrate; and a plurality of electrodes disposed on the substrate, the plurality of electrodes comprising a drive line comprising a plurality of drive electrodes and a first sense line comprising a plurality of sense electrodes;

a touch-sensor controller operable to apply a voltage to at least one of the plurality of drive electrodes; and a display overlaid by at least a portion of the touch sensor;

wherein the first drive line comprises:

a first row of electrodes comprising a first drive electrode, a second drive electrode, and a third drive electrode, the second drive electrode being between and connected to the first drive electrode and the third drive electrode;

a second row of electrodes adjacent the first row of electrodes and comprising a fourth drive electrode adjacent and connected to the first drive electrode and a fifth drive electrode adjacent and connected to the third drive electrode; and a third row of electrodes adjacent the first row of electrodes and comprising a sixth drive electrode adjacent and connected to the second drive electrode;

wherein the second drive line comprises:

a first row of electrodes comprising a first drive electrode, a second drive electrode, and a third drive electrode, the first drive electrode of the second drive line being adjacent to the fourth drive electrode of the first drive line, the third drive electrode of the second drive line being adjacent to the fifth drive electrode of the first drive line, the second drive electrode of the second drive line being between and connected to the first drive electrode of the second drive line and the third drive electrode of the second drive line; and a second row of electrodes adjacent the first row of electrodes of the second drive line and comprising a fourth drive electrode adjacent and connected to the second drive electrode of the second drive line, the fourth drive electrode of the second drive line being adjacent to the second drive electrode of the first drive line and between the fourth drive electrode of the first drive line and the fifth drive electrode of the first drive line;

wherein one or more of the plurality of sense electrodes of the first sense line are each positioned in a respective space formed, in plan view, by electrodes of both the first and second drive lines, the first row of electrodes of the first drive line being separated at a first location along the first row of electrodes of the first drive line from the first row of electrodes of the second drive line at a respective first location along the first row of electrodes of the second drive line by two sense electrodes of the first sense line, the two sense electrodes of the first sense line arranged in a first column of electrodes and being a first sense electrode and a second sense electrode adjacent and connected to the first sense electrode, the first row of electrodes of the first drive line separated from the first row of electrodes of the second drive line by a distance spanning at least both the first sense electrode and the second sense electrode of the first column of electrodes of the first sense line;

wherein the first sense line comprises:

the first column of electrodes comprising the first sense electrode, the second sense electrode, and a third sense electrode, the second sense electrode being between and connected to the first sense electrode and the third sense electrode;

a second column of electrodes adjacent the first column of electrodes and comprising a fourth sense electrode adjacent and connected to the first sense electrode and a fifth sense electrode adjacent and connected to the third sense electrode; and a third column of electrodes adjacent the first column of electrodes and comprising a sixth sense electrode adjacent the second sense electrode; and wherein:

the first sense electrode of the first sense line is positioned in a space formed, in plan view, by the first drive electrode of the second drive line, the second drive electrode of the second drive line, the fourth drive electrode of the second drive line, and the fourth drive electrode of the first drive line;

the second sense electrode of the first sense line is positioned in a space formed, in plan view, by the fourth drive electrode of the first drive line, the fourth drive electrode of the second drive line, the second drive electrode of the first drive line, and the first drive electrode of the first drive line;

the sixth sense electrode of the first sense line is positioned in a space formed, in plan view, by the fourth drive electrode of the second drive line, the fifth drive electrode of the first drive line, the third drive electrode of the first drive line, and the second drive electrode of the first drive line; and the plurality of electrodes comprises a second sense line, the first row of electrodes of the first drive line being separated at a second location along the first row of electrodes of the first drive line from the first row of electrodes of the second drive line at a respective second location along the first row of electrodes of the second drive line by two sense electrodes, the two sense electrodes being the sixth sense electrode of the first sense line and a sense electrode of the seoncd sense line that is adjacent but not connected to the sixth sense electrode of the first sense line, the first row of electrodes of the first drive line being separated from the first row of electrodes of the second drive line by a distance spanning at least both the sixth sense electrode of the first sense line and the sense electrode of the second sense line.

10. The device of claim 9, wherein the second drive line comprises a third row of electrodes comprising a fifth drive electrode and a sixth drive electrode, the fifth drive electrode of the second drive line being adjacent and connected to the first drive electrode of the second drive line, the sixth drive electrode of the second drive line being adjacent and connected to the third drive electrode of the second drive line.

11. The device of claim 9, wherein at least one of the plurality of electrodes disposed on the substrate has a diamond pattern.

* * * * *